United States Patent [19]

Hoeberechts

[11] 4,166,969

[45] Sep. 4, 1979

[54] TARGET AND TARGET ASSEMBLY FOR A CAMERA TUBE AND METHOD OF MANUFACTURING SAME

[75] Inventor: Arthur M. E. Hoeberechts, Eindhoven, Netherlands

[73] Assignee: U.S. Philips Corporation, New York, N.Y.

[21] Appl. No.: 808,786

[22] Filed: Jun. 22, 1977

[30] Foreign Application Priority Data

Jun. 29, 1976 [NL] Netherlands ........................ 7607095

[51] Int. Cl.$^{2}$ ...................... H01J 29/45; H01J 29/02; H04N 9/07

[52] U.S. Cl. .................................. 313/371; 313/384; 358/43; 358/41

[58] Field of Search ............... 313/365, 371, 384, 390, 313/386, 366

[56] References Cited

U.S. PATENT DOCUMENTS

| | | | |
|---|---|---|---|
| 3,548,233 | 12/1970 | Cave et al. | 313/367 |
| 3,612,943 | 10/1971 | Lehmann et al. | 313/384 X |
| 3,740,458 | 6/1973 | Kubota | 313/365 X |
| 3,794,835 | 2/1974 | Hirai et al. | 313/366 X |
| 3,982,149 | 9/1976 | Dieleman et al. | 313/366 |
| 4,059,840 | 11/1977 | van der Polder et al. | 313/371 X |

*Primary Examiner*—Robert Segal
*Attorney, Agent, or Firm*—Algy Tamoshunas

[57] ABSTRACT

A target and target assembly for a camera tube in which a semiconductor plate is provided on an annular support and consists of a semiconductor monocrystalline edge portion which comprises an integrated circuit for handling the electrical signals originating from the target, the central part consisting of a radiation-sensitive layer having one or more radiation-permeable electrodes. The electrodes are connected to inputs of the intergrated circuit of which the leads necessary for supply and control voltages are led through. A window is provided on the electrodes and overlaps the inner edge of the support, the window, the edge portion and the support adjoining each other in a vacuum-tight manner.

7 Claims, 14 Drawing Figures

TARGET AND TARGET ASSEMBLY FOR A CAMERA TUBE AND METHOD OF MANUFACTURING SAME

Figure 1:
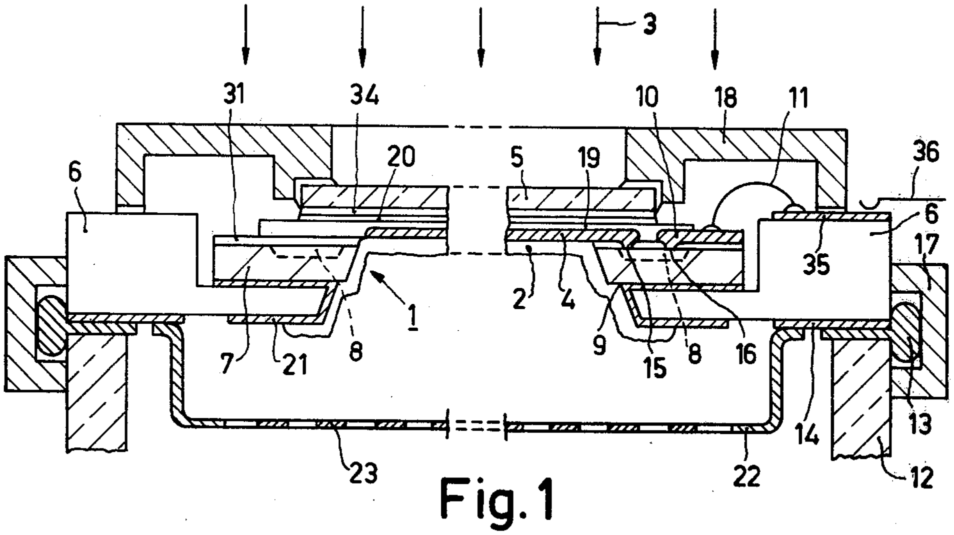

The invention relates to a semiconductor target having a radiation-sensitive layer for converting radiation into electrical signals, the radiation-sensitive layer, on the side of the incident radiation, having at least one electrode which is permeable to the said radiation.

The invention also relates to a target assembly for a camera tube comprising such a semiconductor target in which on the side of the incident radiation a window is present through which radiation can be incident on the layer, the target being provided on a support consisting of a ring of electrically insulating material.

The invention furthermore relates to a camera tube comprising such a target assembly, and to a method of manufacturing said target assembly.

Targets and target assemblies as described above are generally known. The charge image and potential image, respectively, generated by the radiation (which may be both of an electromagnetic and of a corpuscular nature, in accordance with the application) are scanned by an electron beam and the electrical signals originating from the electrode(s) are further processed as a picture signal in a circuit arrangement suitable for that purpose.

The signals originating from the electrode or electrodes will in general first be supplied to a sub-circuit at the output of which the signal is derived in a transformed form, for example in an amplified form, or after having experienced an impedance transformation or delay, and is supplied for further processing to the remaining part of the circuit.

For the signal-to-noise ratio it is of great importance that the signal originating from the electrode(s) should be supplied to the said sub-circuit via a capacitance which is as low as possible. This often presents problems in known target assemblies in which the electrodes of the target are connected inter alia to the camera tube holder and hence provide a rather large input capacitance.

One of the objects of the invention is to provide a target which permits of minimizing the number of glass lead throughs or even avoiding said glass lead throughs entirely.

Another object of the invention is to provide a target assembly for said target which can be manufactured in a technologically advantageous manner and in which the input capacitance for the signal originating from the electrode or electrodes of the target is considerably lower than in known constructions, which target assembly can in addition be provided in the camera tube in a very simple manner.

Another object of the invention is to provide a camera tube which has such a very efficacious target assembly.

Still a further object of the invention is to provide a particularly advantageous method of manufacturing such a target assembly.

The invention is inter alia based on the discovery that the end in view can be achieved by providing the above-mentioned sub-circuit in the form of an integrated circuit together with the target in one semiconductor plate and by using the part of the semiconductor plate comprising said integrated circuit also in a suitable manner during the sealing of the target assembly.

It is to be noted that the term integrated circuits should in this respect be interpreted broadly as a circuit comprising one or more semiconductor circuit elements provided in the semiconductor plate, in which said circuit may in certain circumstances consist of only one semiconductor element, for example one transistor, with associated connection conductors.

Therefore, a target of the aforesaid kind comprises, in accordance with the invention a thick monocrystalline edge portion comprising a circuit which is integrated in said edge portion and which comprises at least one semiconductor circuit element for processing the electrical signals originating from the permeable electrode, and from a thinner control portion comprising the radiation-sensitive layer with the permeable electrode present thereon, which electrode is d.c. connected to an input of the integrated circuit.

The invention is of particular interest in those cases in which the electrodes consist of a large number of stripes which extend substantially parallel to each other. Such a target is disclosed, for example, in U.S. Pat. No. 2,446,249, in which the stripe-shaped electrodes are divided into three groups to provide, for example, a "red", a "blue" and a "green" picture signal. In some cases it is desirable to supply the picture signals originating from each stripe-shaped electrode individually for processing to an input of a shift register having one or more outputs which are connected to the further part of the signal-handling circuit. Such a system is described, for example, in U.S. Pat. No. 4,059,840 the contents of which, in so far as of importance for the present invention, is to be considered as being incorporated in the present application.

The invention provides a construction in which in particular such a combination of stripe-shaped electrodes and one or more shift registers can be realised in a very advantageous manner with a drastic reduction of the required number of connections to the exterior, in which the shift register is integrated in the semiconductor plate and, in contrast with combination possibilities of more conventional nature, no (often comparatively high-ohmic) glass lead-throughs to the target are necessary. In addition, the integrated circuit is not present in the tube vacuum and hence does not disturb or hardly disturbs the electrical field distribution in the proximity of the target.

According to the invention a target assembly of the aforesaid kind is further characterized in that the target, with the side of its edge portion remote from the incident radiation, is secured in a vacuum-tight manner on top of the support, that the window adjoins the said edge portion in a vacuum-tight manner and in projection extends at least up to the inner edge of the annular support, and that the connections of the outputs and the leads of the integrated circuit necessary for the supply and control voltage are connected to conductive layers extending at least partly outside the window on the edge portion and have connection conductors outside the window.

One of the important advantages of the target assembly according to the invention is that the signal input capacitance can be very low since the electrode or electrodes are no longer directly connected to the camera tube holder but are connected directly to the input of the integrated circuit. Furthermore, glass lead-throughs through the tube are in principle not necessary, while it will suffice to have a pressure-resistant window of considerably smaller dimensions that the cross-section of the camera tube, in contrast with known constructions.

In order to increase the pressure resistance of the construction, a preferred embodiment is characterized in that the whole edge of the window overlaps the inner edge of the support although in certain circumstances it may be sufficient for the edges of the window and the support to coincide. As a result of this, stresses in the semiconductor plate are minimized.

Another important advantage of the target assembly according to the invention is that the gauze plate, used in known camera tubes to provide a favourable field for substantially perpendicular incidence of the electron beam, can be integrated in said target assembly in a simple manner. For that purpose, a preferred embodiment is characterized in that a gauze plate is present on the side of the support remote from the target, the edge of said plate being conductively connected to a metallisation provided on the edge of the support.

The vacuum-tight connection of the window to the edge portion of the target is advantageously formed via an insulating layer, for example a glass layer, extending on the side of the incident radiation over the target and the electrodes and metal layers present thereon, on which insulating layer the window is secured. This is advantageous technologically.

The invention moreover provides the possibility, when using mutually parallel stripe-shaped electrodes, to integrate in a very suitable manner a colour filter in the target assembly, the colour filter being situated between the window and the stripe-shaped electrodes and comprising bands of different spectral permeability extending parallel to the stripe-shaped electrodes.

A particularly suitable method of manufacturing a target assembly of the kind described is furthermore characterized in that starting material is a semiconductor plate of a substantially homogeneous thickness, that an integrated circuit is formed on one side in an edge portion of said plate, that the central part of the plate on the said one side is provided with at least one electrode which is permeable to radiation and which is d.c. connected to an input of the integrated circuit, that the outputs of the integrated circuit are provided with metal layers extending on the said edge portion, that the semiconductor plate is then secured in a vacuum-tight manner on the other side with the said edge portion to an annular support of an electrically insulating material, that a window which is pervious to the said radiation is then secured to the one side in such manner that the edge of the window in projection extends at least up to the inner edge of the support, the said metal layers projecting beyond the window, that the central portion of the semiconductor plate on the other side is then subjected to a material-removing treatment as a result of which the material of the central portion is removed entirely until the permeable electrode becomes exposed in the resulting aperture, after which a radiation-sensitive layer is provided at least in said aperture and on the electrode.

Figure 2:
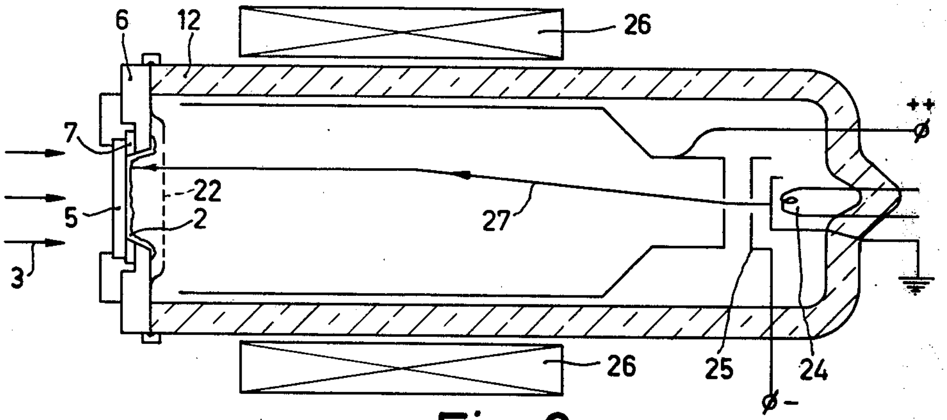
Figure 13:
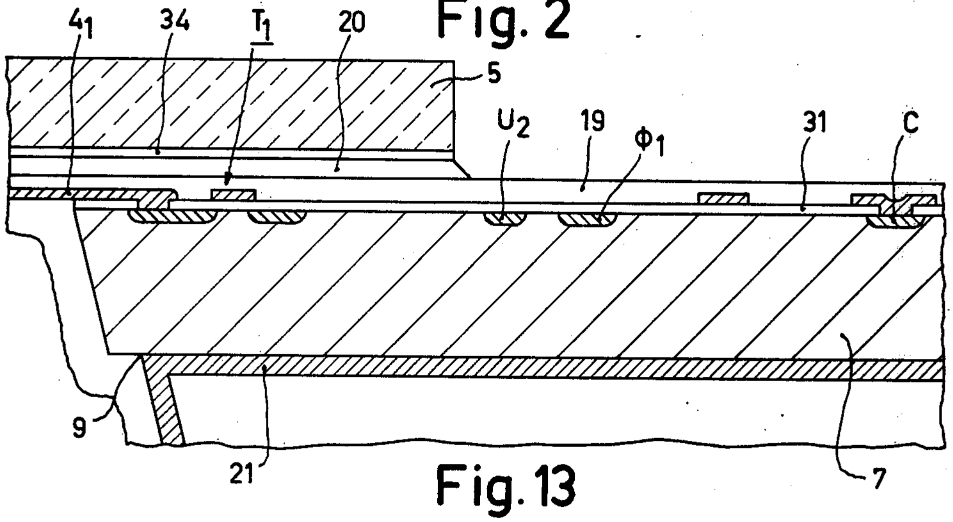
Figure 3:
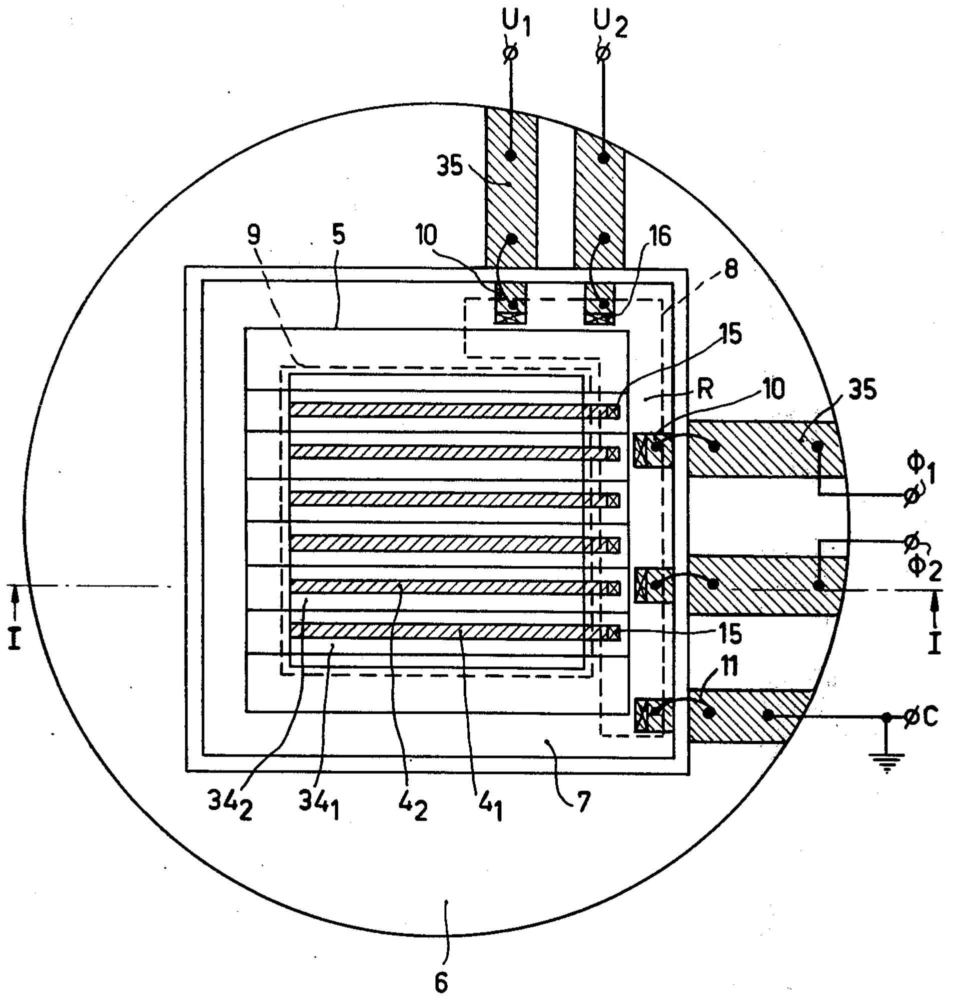
Figure 3A:
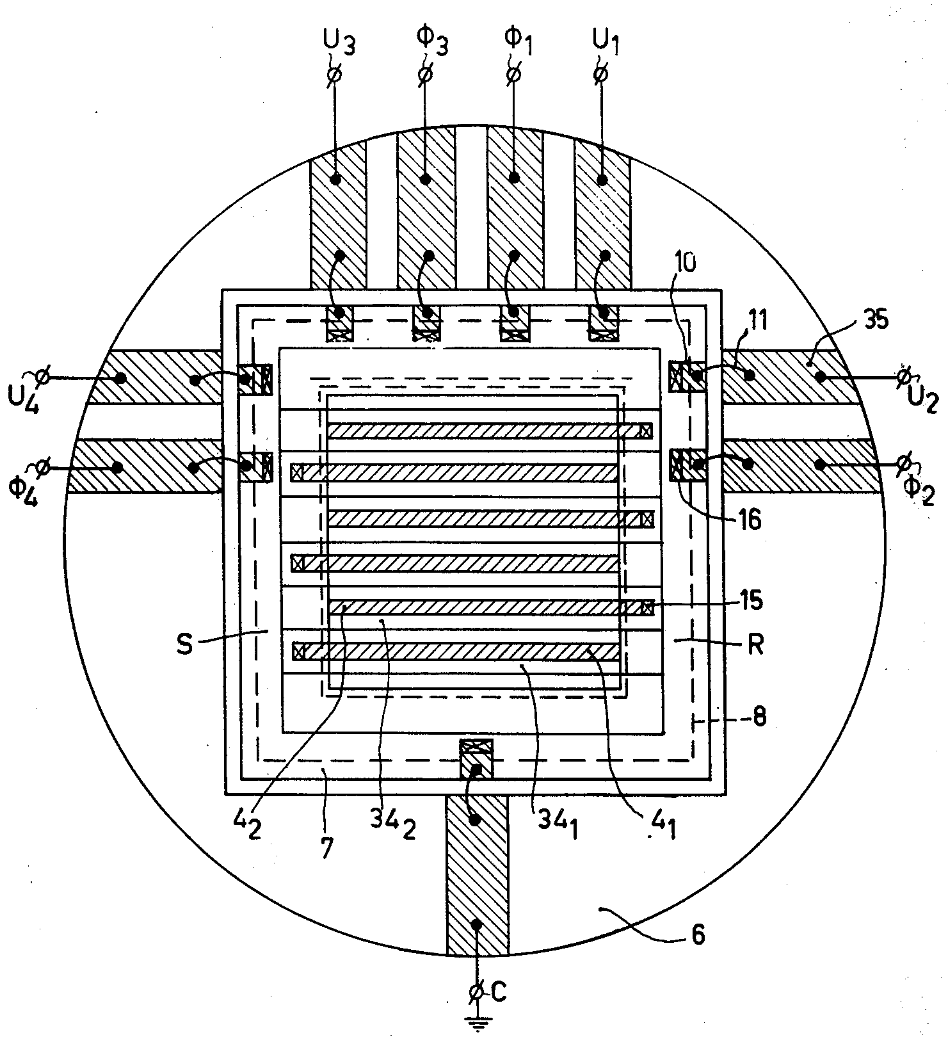
Figure 4:
Figure 5:
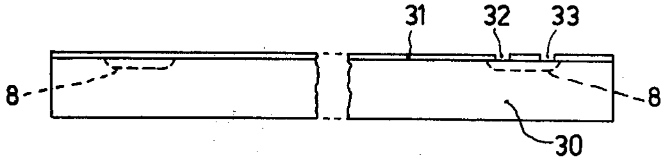
Figure 10:
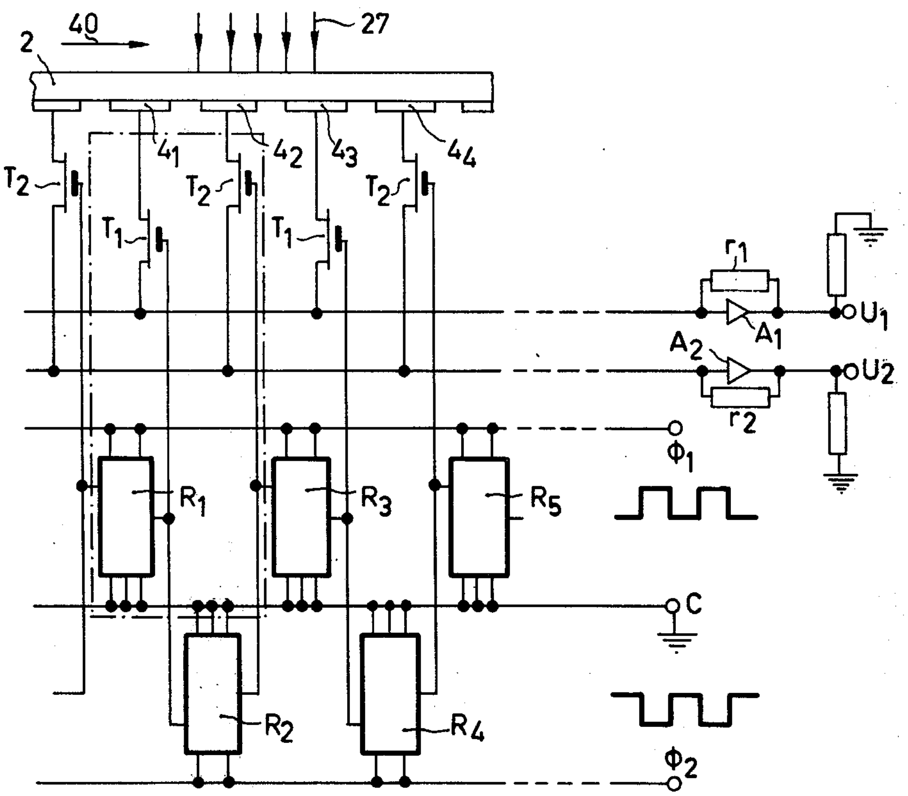
Figure 11:
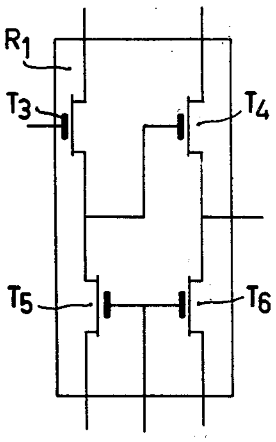
Figure 12:
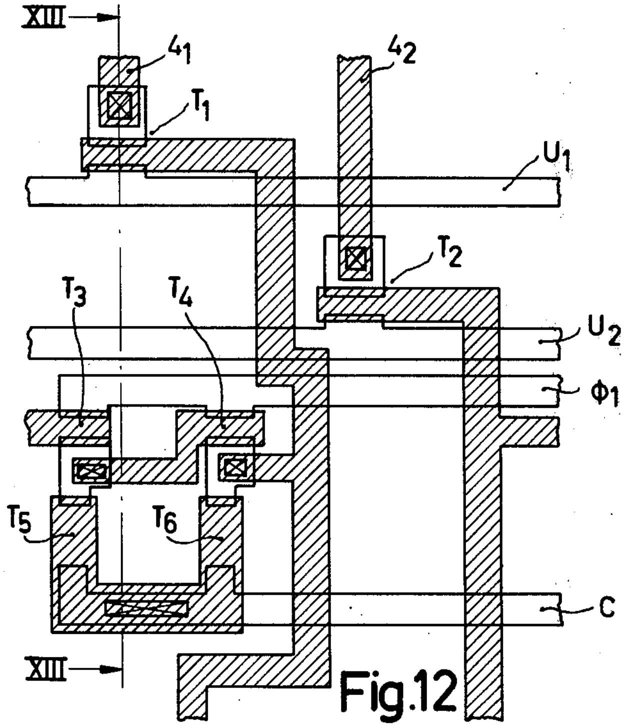

The invention will now be described in greater detail with reference to an embodiment and the drawing, in which FIG. 1 is a diagrammatic cross-sectional view of a target assembly having a target according to the invention, FIG. 2 is a diagrammatic cross-sectional view of a camera tube having a target assembly according to the invention, FIG. 3 is a diagrammatic plan view of the target assembly of which FIG. 1 is a cross-sectional view taken on the line I—I, FIG. 3*a* shows a modified embodiment of FIG. 3, FIGS. 4 to 9 are diagrammatic cross-sectional views of a target assembly according to the invention in successive stages of manufacture, FIG. 10 shows diagrammatically a circuit arrangement in which the target is incorporated, FIG. 11, shows a detail of the circuit arrangement shown in FIG. 10, FIG. 12 is a plan view of a part of the circuit arrangement shown in FIG. 10, and FIG. 13 is a diagrammatic cross-sectional view taken on the line XIII—XIII of FIG. 12.

The figures are purely diagrammatic and not drawn to scale. Corresponding parts are as a rule referred to by the same reference numerals.

FIG. 1 is a diagrammatic cross-sectional view of a target assembly for a camera tube having a target according to the invention. The target assembly comprises a semiconductor target 1, in this embodiment of p-type silicon, having a radiation-sensitive layer 2, in this embodiment consisting of antimony trisulphide, for converting radiation (denoted in FIG. 1 by the arrows 3) into electrical signals. On the side of the incident radiation 3 the radiation-sensitive layer 2 has at least one electrode 4 which is permeable to the radiation 3. In this embodiment a number of mutually substantially parallel stripe-shaped permeable electrodes $4_1$, $4_2$, $4_3$, etc. are provided, as will be obvious from the diagrammatic plan view of FIG. 3.

According to the invention the target is further constructed from an edge portion 7 of monocrystalline silicon, which edge portion 7 comprises an integrated circuit for handling the electrical signals originating from the permeable electrodes 4, and of a central portion consisting of the radiation-sensitive layer 2 with thereon the permeable electrodes 4 which are d.c. connected to an input 15 of the said integrated circuit. The integrated circuit which may be composed in a variety of manners is not shown in detail in FIGS. 1 to 9 but is situated within the broken-line area of the edge portion 7 denoted by 8. According to the invention, the target assembly is constructed so that the target is secured to the support 6 consisting of a ring of insulating material in a vacuum-tight manner with the side of its edge portion 7 remote from the incident radiation 3. On the side of the incident radiation 3 a glass window 5 is also present through which radiation 3 can be incident on the layer 2, the window 5 adjoining the said edge portion 7 in a vacuum-tight manner and in projection extending at least up to the inner edge 9 and in this embodiment overlapping the inner edge 9 of the annular support 6, see FIG. 1. According to the invention, the connections 16 of the outputs and the leads of the integrated circuit necessary for supply and control votage are connected to conductive layers 10 extending at least partly outside the window 5 on the edge portion 7 and having connection conductors 11 outside the window 5. In the embodiment described the support 6 has on its outer edge a thicker part which is metallized at least partly on the side of the incident radiation 3, the connection conductors 11 connected to the connections 16 of the integrated circuit for the output, supply and control voltages being connected on said metallisation 35 and an external connection conductor 36 also adjoining said metallisation 35, see FIG. 1.

The target assembly described can be provided with the support 6 directly on the glass envelope 12 of a camera tube, for example by means of an indium weld 13 which connects a metal layer 14 provided on the support 6 to the glass tube 12, as shown in FIG. 1. Since as a result of this the electrodes 4 are not connected to the camera tube holder but directly to the input 15 of the integrated circuit, the capacitance at the signal input is low. A further important advantage, see FIG. 1, is that on the side of the target no glass leadthroughs are necessary and that a comparatively small cross-section of the window 5 will suffice which need not cover the whole cross-section of the tube 12 and hence can easily withstand the external pressure. Since the window extends at least up to the edge 9 of the support an assembly is obtained which can withstand high pressures. For protection, the screening caps 17 and 18 (see FIG. 1) may still be provided.

In this embodiment the vacuum-tight connection of the window 5 to the edge portion 7 of the target is formed by an insulating layer, in this case a silicon oxide layer 19, which on the side of the incident radiation 3 extends over the target and the electrodes 4 and metal layers 10 present thereon, the window 5 being secured to said insulating layer 19, in this embodiment by means of a transparent cement 20, see FIG. 1. However, it would in principle also be possible to cement the window directly to the target and the electrodes. By using the insulating glass or oxide layer 19, damage to the target, in particular to the thin central portion thereof, is mitigated.

As in this embodiment, the edge portion 7 of the target on the side of the support 6, and the support 6 at the area of its contact face with the target, are preferably metallized. In the present example same metallisation 21 also extends over the inner edge of the support 6, which, however, is not necessary.

As shown in FIG. 1, in a target assembly according to the invention the usual gauze plate serving to promote perpendicular incidence of the electron beam can be provided in a particularly advantageous manner. As a matter of fact this may be done by conductively connecting the edge 22 of said gauze plate 23 to the already mentioned metallisation 14 provided on the edge of the support 6, so that said gauze plate 23 is formed integral with the target assembly.

FIG. 2 shows how the target assembly described is provided in a camera tube according to the invention, which camera tube also comprises the usual means (thermionic cathode 24, Wehnelt cylinder 25, deflection coils 26 etc.) to form an electron beam 27 with which the side of the target remote from the incident radiation 3 can be scanned, the outer edge of the support 6 being secured in a vacuum-tight manner to the edge of the camera tube 12 on the side remote from the radiation 3.

A target assembly as shown in FIGS. 1 and 3 is advantageously manufactured according to the invention as follows.

Starting material (see FIG. 4) is a semiconductor plate 30, for example of p-type silicon, having a resistivity of, for example, 6 Ohm.cm and, for example an orientation (100). The plate 300 has a substantially homogeneous thickness of 250 microns. By using doping methods conventionally used in semiconductor technology, for example diffusion or ion implantation which are of no essential importance for the invention and will therefore not be described in detail here, an integrated circuit is formed on one side in an edge portion of said plate. Said integrated circuit which may have a variety of shapes is shown diagrammatically in FIG. 5 by broken lines 8. During the manufacture of said integrated circuit, an oxide layer 31 is formed on the plate 30 which in this example, although not strictly necessary, is removed from the lower side of the plate, while furthermore contact windows (32, 33) for connecting conductors to the integrated circuit are photolithographically etched in the layer 31 in the usual manner.

Figure 6:
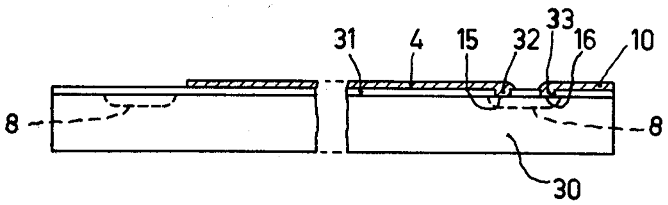

The central portion of the plate 30 is now provided with at least one electrode 4 pervious to radiation on the said one side where the integrated circuit is situated. In this example, several mutually parallel stripe-shaped electrodes 4 are provided, for example consisting of layers of $SnO_2$ and/or $InO_2$, thickness, for example, 0.2 micron. FIG. 6 is a cross-sectional view of one of the electrodes 4. In certain circumstances, however, one single electrode 4 covering the whole central portion of the plate might also be used. The electrodes 4 are each connected to an input 15 of the integrated circuit via a window 32. The $SnO_2$ layer is obtained, for example, by vapour deposition (see, for example, "Thin Solid Films" vol. 33, 1976, page L5) or spraying. The layer is given the shape of stripe-shaped electrode layer 4, for example, by covering the layer with a chromium mask and sputtering away the non-masked part of the layer, after which the chromium is removed.

The output connections 16 of the integrated circuit are provided with metal layers 10, for example aluminum layers, which extend on the edge portion of the plate on the oxide layer 31 and adjoin the integrated circuit via the windows 33, see FIG. 6. These layers are provided by vapour-depositing aluminum and etching to the desired shape by using the conventional photolithographic etching method. A 0.6 micron thick protecting silicon oxide layer 19 is then deposited pyrolytically over the assembly. However, this is not strictly necessary for the invention.

Figure 7:
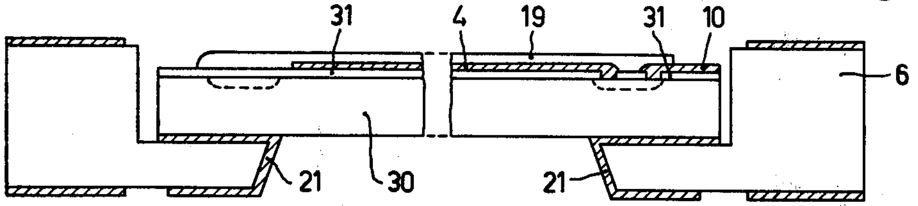
Figure 8:
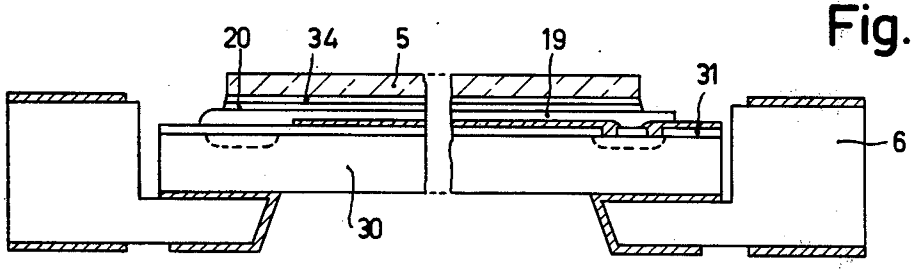
Figure 9:
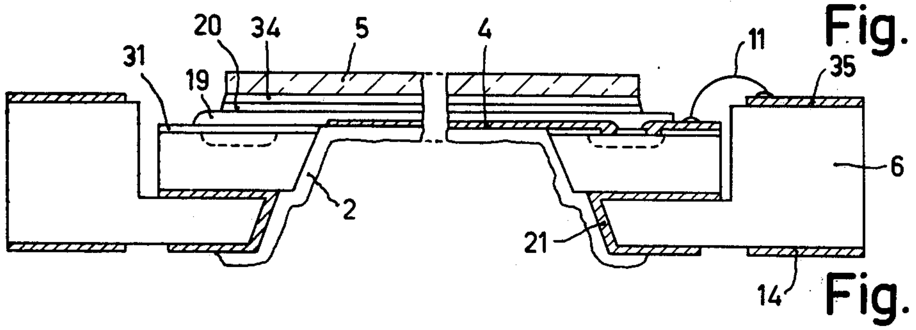

The semiconductor plate 30 is then secured with its edge portion in a vacuum-tight manner on the other side of an annular support 6, see FIG. 7. The support 6 is of electrically insulating material, in this example ceramic material. The edges of the support are metallized in this example, for example, with a layer 21 of copper or aluminum. Since in this example the oxide layer 31 has been removed from the lower side of the plate 30, same can easily be provided with its edge, for example via a silicon-gold alloy, to the metallisation 21 of the support. When the oxide layer 31 is not removed from the lower side of the plate, another method of vacuum-tight sealing (cementing) will be chosen.

A window 5 which is permeable to the incident radiation is then secured to one side where the integrated circuit is situated. In this case this is a glass window having a thickness of a few millimeters, for example, between 1 and 6 mm, on which a colour filter 34 is provided consisting of vapour-deposited stripes having different spectral permeabilities which alternatively pass three complementary colours, for example, red, green and blue. These stripes consist, for example, of $TiO_2$-$SiO_2$ layers. The stripes $34_1$, $34_2$ and so on of the colour filter 34 present on the window 5 (see FIG. 3) are each positioned opposite to an electrode stripe $4_1$, $4_2$ and so on. They can be aligned thereto directly in a simple manner, after which the window is secured to the oxide layer 19 with the filter side by means of a transparent layer 20 of cement. The diameter of the window 5 is chosen to be so that in projection it extends at least up to the inner edge of the support 6, in which in this example the window overlaps said inner edges, see FIG. 8.

The central part of the silicon plate is then etched away from the side facing the support 6, for example in an etching bath containing KOH, $K_2Cr_2O_7$ and isopropanol, or in a hydrazine-containing etchant, the remaining parts of the device being protected against said etching process by an etching mask not shown in the drawing. Etching is discontinued automatically when the silicon is etched through throughout the thickness, since the silicon oxide layer 31 is substantially not attacked by the etching bath. In a second etching step, for example with a HF-containing etchant, the oxide layer 31 is then removed on the central part of the plate until the electrode layers 4 are exposed. A radiation-sensitive layer 2, in this example antimony trisulphide ($Sb_2S_3$), for example 1 micron thick, is then provided on said electrode layers 4 and on the edge of the plate 30 by vapour-depositing in a vacuum via a mask. If desired, in this stage the conductors 11 may also be provided which adjoin metallised portions 35 of the support 6.

In principle the target assembly is now ready. If desired, a gauze plate 23, for example of copper gauze, may now be conductively connected with its edge 22 to the metallisation 14 of the support 6, for example by spot welding, after which the assembly may be secured via an indium weld 13 to the glass envelope 12 of the camera tube, see FIGS. 1 and 2, after which the tube with its further components may be assembled in known manner.

It is to be noted that if the target is not used for visible light but, for example, in the infrared, the electrode layer 4 may also be manufactured advantageously from polycrystalline silicon. which may be attractive technologically. The way in which a target of the above-described kind can be used is described in detail in the above-mentioned U.S. Pat. No. 4,059,840. Moreover, the operation will be described in outline with reference to FIGS. 10 to 13.

FIG. 10 shows diagrammatically the circuit arrangement with which the target of the camera tube as described above is read out. A radiation image is incident on the radiation-sensitive layer 2 via the transparent electrode stripes $4_1$, $4_2$ and so on. Prior to the incidence of the radiation, the oppositely located surface is brought at the potential of the electron gun, which in this example is connected to earth, by scanning with the electron beam 27. As a result of the incident radiation, the capacitances formed by the parts of the layer 2 underlying the stripes 4 are discharged to a greater or smaller extent. As a result of this, a potential image corresponding to the radiation image is formed on the radiation-sensitive layer 2. By scanning the layer 2 again with the electron beam 27 in a direction normal to that of the stripes 4 (the direction of the arrow 40 in FIG. 10), the scanned surface is again brought at earth potential and the potential image is transferred to the stripes 4. From the stripes 4 the signal is transferred in this example to two outputs $U_1$ and $U_2$ by alternately closing switches which are formed by MOS transistors $T_1$ and $T_2$. For that purpose the electrode stripes 4 are divided into two groups, the transistors $T_1$ being connected to the stripes $4_1$, $4_3$ and so on, the transistors $T_2$ being connected to the intermediate stripes $4_2$, $4_4$ and so on. Only a few stripes 4 are shown in FIGS. 3 and 10, their number actually being usually 400 to 800.

When, for example, the transistor $T_1$ associated with the electrode stripe $4_1$ becomes conductive, the capacitance associated with said stripe is discharged via the output line $U_1$ in which an amplifier $A_1$ with fed back resistor $r_1$ is incorporated, and a corresponding video signal appears at the output $U_1$ and is processed in the usual manner in a further circuit not shown. The stripes $4_2$, $4_4$ and so on similarly provide a video signal at the output $U_2$ via the amplifier $A_2$ with fed back resistor $r_2$.

The voltage pulses at the gate electrodes of the transistors $T_1$ and $T_2$ with which these are made conductive are supplied by a shift register R with identical stages $R_1$, $R_2$, . . . $R_n$. In this example the shift register is of the type described in I.E.E.E. International Solid State Circuits Conference, February 1971, pages 130–131. FIG. 11 shows the electrical circuit diagram of one state ($R_1$); each stage comprises four MOS transistors $T_3$ to $T_6$. The shift register R has an earth connection C; the odd stages $R_1$, $R_3$ and so on and the even stages $R_2$, $R_4$ and so on are operated with clock pulses $\phi_1$ and $\phi_2$, respectively, the shape of which is shown diagrammatically in the figure. A starter pulse introduced at the beginning of the shift register on a transistor $T_3$ is passed through the register by the clock pulse and provides in each stage a voltage at the gate electrode of the field effect transistor connected to said stage ($T_1$, $T_2$, respectively), so that said transistor becomes conductive at that instant and provides an output signal at $U_1$ and $U_2$, respectively. The target is read out in this manner, which reading-out is repeated after each frame scan period.

According to the invention, in this example the transistors $T_1$ and $T_2$, as well as the shift register, are incorporated as an integrated circuit in the edge portion 7 of the target. For illustration, the plan view of FIG. 12 shows the part which in FIG. 10 is surrounded by the dot-and-dash line, while FIG. 13 is a diagrammatic cross-sectional view through a part of the edge 7 of the target taken on the line XIII—XIII of FIG. 12. In FIGS. 3, 3*a* and 12 the contact holes are denoted by a diagonal cross, the metal layers are shaded and the boundaries of the n-type zones diffused in the p-type region 7 are denoted by solid lines. For simplicity, the oxide layer 31 in FIG. 13 is shown to have the same thickness everywhere, which means that differences in thickness between field oxide and gate oxide have been neglected; details, for example the usual channel-stopping zones, are also omitted. As shown in FIGS. 12 and 13, the conductors $U_1$, $U_2$ $\phi_1$, $\phi_2$ and C are formed by highly doped n-type zones which are contacted elsewhere on the plate. The further connections and the gate electrodes are formed by metal layers extending on the oxide layer 31. According to a modified embodiment which is shown diagrammatically in the plan view of FIG. 3*a*, the edge portion 7 of the plate can be used more efficiently by connecting the electrode stripes 4 alternately on oppositely located sides of the plate to two opposite shift registers $R_{1 \ldots n}$ and $S_{1 \ldots n}$, having outputs and clock voltages, $U_1$, $U_2$, $\phi_1$, $\phi_2$ and $U_3$, $U_4$, $\phi_3$ and $\phi_4$, respectively, and a common connection C, while the clock voltages may be coupled mutually, if desired. A further modified embodiment can be obtained by connecting together the electrode stripes 4, for example in three groups (for three complementary colours), and reading out. If desired, the amplifiers $A_1$ and $A_2$ may also be incorporated in the edge portion of the semiconductor plate.

As shown in the figures, according to the invention, a small number of leadthroughs are necessary in spite of a large number of electrode stripes, for which no glass leadthroughs need be used in the target assembly according to the invention.

The construction with stripe-shaped electrodes and with the use of shift registers has been given only by way of example; the construction of the electrode layer or layers 4 and of the integrated circuit may be varied at will. Shift registers of a type quite differing from the registers described here may also be used.

What is claimed is:

1. A camera tube having a radiation permeable window and a semi-conductor target comprising a radiation sensitive-layer having a central portion of given thickness for converting radiation into electrical signals, a radiation permeable electrode on a side of the target exposed to incident radiation, said target having a monocrystalline edge portion thicker than the central radiation sensitive portion, said thicker edge portion having a circuit integrated therein which includes a semi-conductor element for processing electrical signals originating from the permeable electrode, said permeable electrode being d-c connected to an input of the integrated circuit, an annular, electrically insulating support for said semi-conductor target, the side of the edge portion of said target remote from the incident radiation being secured in a vacuum-tight manner to the support, the window being secured in a vacuum-tight manner to said thicker edge portion and overlapping the inner edge of the annular support, and connections of the outputs and leads of the integrated circuit necessary for supply and control voltage being connected to conductive layers extending at least partly outside the window on said thicker edge portion and having connection conductors outside the window.

2. A camera tube as claimed in claim 1 wherein the vacuum-tight connection of the window to the edge portion of the target is formed by means of an insulating layer extending on the side of the incident radiation over the target and the electrodes and metal layers present thereon, on which insulating layer the window is secured.

3. A camera tube as claimed in claim 1 wherein the edge portion of the target on the side of the support, and the support at the area of its contact face with the target are metallized.

4. A camera tube as claimed in claim 1, wherein a gauze plate is present on the side of the support remote from the target and has its edge conductively connected to a metallisation provided on the edge of the support.

5. A camera tube as claimed in claim 1, wherein the window on the side of the stripe-shaped electrodes comprises a colour filter with stripes of different spectral permeabilities extending parallel to the stripe-shaped electrodes.

6. A camera tube as claimed in claim 1, wherein the support comprises on its outer edge a thicker part which is at least partly metallized on the side of the incident radiation, the connection conductors connected to the output, supply and control voltage connections of the integrated circuit being secured to said metallisation, an external connection conductor being also connected to said metallisation.

7. A camera tube as claimed in claim 1 including means to form an electron beam with which the target can be scanned on the side remote from the incident radiation, the outer edge of the support being connected in a vacuum-tight manner to the edge of the camera tube on the side remote from the incident radiation.

* * * * *